United States Patent Office 3,721,696
Patented Mar. 20, 1973

3,721,696
POLYOXYPERFLUOROMETHYLENE COMPOUNDS AND PROCESS OF THEIR PREPARATION
Dario Sianesi, Giancarlo Bernardi, and Giovanni Moggi, Milan, Italy, assignors to Montecatini Edison S.p.A., Milan, Italy
No Drawing. Continuation of abandoned application Ser. No. 652,000, July 10, 1967. This application Nov. 27, 1970, Ser. No. 93,385
Int. Cl. C07c 51/58, 59/22
U.S. Cl. 260—463
14 Claims

ABSTRACT OF THE DISCLOSURE

Linear polyethers having the group —COF as a terminal group. Polyethers may be of the formula

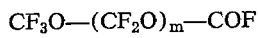

$CF_3O—(CF_2O)_m—COF$ or $CF_3O—(CF_2O)_n—CF_2—COF$ where $m$ is a whole number from 1 to 100 and $n$ is zero or a whole number from 1 to 100.

---

This application is a continuation of application S.N. 652,000, filed July 10, 1967, and now abandoned.

CROSS-REFERENCE TO RELATED APPLICATION

Previously there has been described (U.S. patent application Ser. No. 446,292, filed Apr. 7, 1965) that, in the presence of suitable activators such as certain ultraviolet or γ radiations, a combination reaction take place between perfluoropropylene maintained in the liquid state and molecular oxygen, which leads prevailingly to the formation of polymeric products, the structure of which is essentially that of polyethers of perfluoropropylene

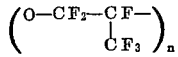

$$\left(\begin{array}{c}O—CF_2—CF—\\ |\\ CF_3\end{array}\right)_n$$

perhaps also containing peroxidic groups.

BACKGROUND OF THE INVENTION

(1) Field of the invention

The present invention relates to new compounds consisting essentially of carbon, fluorine and oxygen and to a process for their preparation.

(2) Description of the prior art

Reactions of gaseous perfluoropropylene with oxygen have previously been described. These reactions usually have been carried out under the influence of electromagnetic radiations, and have always led essentially to the formation of simple products of the oxidative demolition of the olefin [Heiklen, Knight, J. Phy. Chem. 69, 3641 (1965)], or of the epoxide of the olefin [British Pat. 931,587 (1963)].

SUMMARY OF THE INVENTION

We have now prepared linear polyethers having as a terminal group the function —COF, which polyethers have the general formula:

(A) $CF_3O—(CF_2O)_m—COF$, and
(B) $CF_3O—(CF_2O)_n—CF_2—COF$ in which $m$ is a whole number from 1 to 100 and $n$ may be zero or a whole number from 1 to 100.

According to the process of preparation, the foregoing products are normally obtained in admixture with each other. Pure chemical compounds belonging to one or the other series and characterized by a particular value of $m$ or $n$ can be isolated from these mixtures by conventional processes, such as, e.g. fractional distillation.

The present invention further relates to all of the products which may be derived from those described above through well known transformations of the —COF terminal group, namely, the typical reactions of halides of carboxylic acids, such as, e.g., hydrolysis, esterification, salt formation, amidation, dehydration of the resultant amide to a nitrile, decarboxylation, etc.

DESCRIPTION OF THE PREFERRED EMBODIMENTS

The products identified by the general formula (A) may be considered as oligomers or polymers of carbonyl fluoride, $COF_2$.

Actually, that member of this series when $m=0$, namely, trifluoromethylfluoroformate, $CF_3OCOF$, is the only member of this series that has been previously described, inasmuch as it can be obtained by different methods which are based either on the reaction between CO and $CF_3OF$ (P. J. Aymonimo, Chem. Communications 1965, 241) or on the dimerization of $COF_2$ (U.S. Pat. 3,226,418, Dec. 28, 1965).

The polyoxyperfluoromethylenic compounds of the present invention are obtained by reacting, in the gaseous phase, a perfluorinated olefin, preferably perfluoropropylene, and oxygen.

The process of the present invention for the preparation of polyoxyperfluoromethylenic compounds having the general formula

$CF_3—O—(CF_2O)_m—COF$ and $CF_3—O—(CF_2O)_n—CF_2—COF$ in which $m$ is a whole number from 1 to 100 and $n$ is zero or a whole number from 1 to 100, and of their mixtures, comprises reacting hexafluoropropylene and oxygen in the gaseous phase, in molar ratios between 2:1 and 1:10, preferably between 1:1 and 1:3, under a total pressure of between about 0.1 and 10 atmospheres, preferably between about 0.2 and 2 atmospheres, and at temperatures of from about 300° to 1000° C., preferably from about 350 to 700° C., the heating time being between about 0.01 and 20 seconds, preferably between about 0.1 and 10 seconds.

The usefulness of the products of this invention is in part due to their chemical behavior and is therefore different for the two series of products.

The products of the (B) series having the general formula $CF_3O—(CF_2O)_nCF_2COF$ have been found to be particularly stable against prolonged exposure to high temperatures. By reactions with water or aqueous bases, they can be easily transformed into free acids or into salts. The free acids, and their alkaline or ammonia salts, have a surface activity which is a function of the length of the chain and, within given limits of such length, will reach extremely high values. The products belonging to this series are therefore useful in the field of surface-active agents having high thermal and chemical stability. These surface-active agents may be used in all fields that modern technology indicates, more particularly for electrochemical deposition processes, for polymerization processes, for the treatment of fabrics, and in the field of lubricants.

Derivatives of these acids, e.g. their salts, will impart properties of water and oil repellency to fibers, fabrics or pelts.

Other derivatives of these products, such as, e.g., esters, nitriles, etc., due to their particular characteristics, find use as solvents for reaction media, and as fluids for heat transmisison, e.g., heat exchange fluids.

The different chemical reactivity of the compounds of the (A) series of the general formula

$CF_3O—(CF_2O)_nCOF$ indicates other fields of application for them. These compounds, by reactions with organic and inorganic bases, with alcohols, etc., give the same type of reaction products that would be obtained by reaction of $COF_2$. The compounds according to the invention can therefore be useful intermediates for various syntheses (e.g., of organic carbonates, substituted ureas, etc.) when it is not convenient to use dangerously toxic gases such as phosgene or carbonyl fluoride.

Other useful applications of these compounds derive from the possibility of transforming, through suitable reactions, the terminal groups —OCOF into more stable terminal groups. This also enables one to obtain a remarkable thermal and chemical stability for the entire polyether chain.

For instance, from the literature, processes are known for transforming this group, —OCOF, into an ether group, —O—$CF_3$, by reaction with suitable compounds such as sulfur tetrafluoride.

Other reactions will lead to the obtention of groups having an acid function. An example of this is the reaction with the epoxide of hexafluoropropene. This reaction leads to terminal groups —O—$CF_2$—O—$CF(CF_3)COF$, resulting in a high thermal and chemical stability.

The products according to the invention, modified as described previously, are useful as reaction media, fluids for heat transfer, hydraulic fluids, solvents, etc. Where these products possess a terminal group with an acid function, they can give fluorinated surface-active agents having particularly good thermal and chemical stability.

The following examples will further illustrate our invention.

The structures assigned to all the new products conform to the results of elemental analysis, determinations of molecular weight, chemical transformations, spectroscopic characteristics (I.R. and NMR).

EXAMPLE 1

Into a tubular copper reactor (inner diameter of 4 mm.) heated at 350° C. for a length of 270 mm. by means of an electric furnace, there were introduced under atmospheric pressure $C_3F_6$ at a flow rate of 0.6 N l./h. and $O_2$ at a flow rate of 1.8 N l./h.

The products leaving the reactor were collected in collectors, cooled with a solid $CO_2$-acetone mixture, and with liquid nitrogen. The reaction was carried on for about 250 hours, during which time there was introduced into the reactor a total of 1 kg. of $C_3F_6$. The products obtained from the reaction were separated by fractional distillation and by preparative chromatography. $C_3F_6$ appeared to be 95.9% converted. The following products were identified, wherein there is also reported percent by weight based on the total reaction products:

| | Percent |
|---|---|
| Carbonyl fluoride, $COF_2$ (boiling temp. −78° C.) | 40.0 |
| Trifluoroacetyl fluoride, $CF_3$—COF (boiling temp. −58° C.) | 37.4 |
| Trifluoromethylfluoroformate, $CF_3$—O—COF (boiling temp. −34° C.) | 7.3 |
| 3 - oxa - pentafluorobutanoylfluoride, $CF_3OCF_2COF$ (boiling temp. −9.7° C.) | 3.3 |
| 2-oxa-pentafluoropropylfluoroformate, $CF_3$—O—$CF_2$—O—COF (boiling temp. +7° C.) | 2.7 |
| 3,5-dioxa-heptafluorohexanoylfluoride, $CF_3OCF_2OCF_2COF$ (boiling temp. +30° C.) | 0.8 |
| 2,4-dioxa-heptafluoropentylfluoroformate, $CF_3O(CF_2O)_2COF$ (boiling temp. +45° C.) | 1.3 |
| 3,5,7-trioxa-nonafluorooctanoylfluoride, $CF_3$—O—$(CF_2O)_2$—$CF_2$—COF (boiling temp. 13° C./250 torr) | 0.5 |
| 2,4,6-trioxa-nonafluoroheptylfluoroformate, $CF_3$—O—$(CF_2O)_3$—COF (boiling temp. 27–29° C./250 torr) | 0.5 |
| 3,5,7,9 - tetraoxa - undecafluorodecanoyl fluoride, $CF_3$—O—$(CF_2O)_3$—$CF_2$—COF (boiling temp. 35° C./150 torr) | 0.8 |
| 2,4,6,8 - tetraoxa - undecafluoronoylfluoroformate, $CF_3$—O—$(CF_2O)_4COF$ (boiling temp. 47–49° C./150 torr) | 0.7 |
| 3,5,7,9,11-pentaoxa - tridecafluorododecanoyl fluoride, $CF_3O(CF_2O)_4$—$CF_2COF$ (boiling temp. 55° C./150 torr) | 0.4 | and also 4.3% by weight of products of higher molecular weight, having a structure analogous to those of the aforelisted products, and having an average composition: C=18.4%, F=57.5%; O=24.1% and average molecular weight of about $10^3$.

The structures of the aforelisted compounds were determined and verified from centesimal analysis, from determinations of molecular weight, from the I.R. spectrum (which show in particular bands attributable to —COF groups), and, in particular, from the nuclear magnetic resonance spectrum (NMR) which are described hereinbelow for the single compounds.

$CF_3$—O—COF: The NMR spectrum showed a quartet (relative intensity 1) at 15.5 p.p.m. (from $CFCl_3$) and a doublet (relative intensity 3) at 62.0 p.p.m.

$CF_3$—O—$CF_2$—O—COF: The NMR spectrum showed a triplet (relative intensity 1) at 14.7 p.p.m. (from $CFCl_3$); a quintet (relative intensity 2) at 59.2 p.p.m.; a triplet (relative intensity 3) at 57.7 p.p.m.; all the signals showed a fine structure.

$CF_3$—O—$(CF_2O)_2$—COF: The NMR spectrum showed a triplet (relative intensity 1) at 14.8 p.p.m. (from $CFCl_3$); a quartet relative intensity 2) at 59.0 p.p.m., a sextet (relative intensity 2) at 56.0 p.p.m., a triplet (relative intensity 3) at 57.8 p.p.m. All the signals showed a fine structure.

$CF_3$—O—$(CF_2O)_3$—COF: The NMR spectrum showed a triplet (relative intensity 1) at 14.8 p.p.m. (from $CFCl_3$), a quartet (relative intensity 2) at 58.6 p.p.m.; a complex band (relative intensity 4) centered at 55.5 p.p.m., a triplet (relative intensity 3) at 57.5 p.p.m. The signals showed a fine structure.

$CF_3$—O—$(CF_2O)_4$—COF: The NMR spectrum showed a triplet (relative intensity 1) at 14.8 p.p.m. (from $CFCl_3$), a quartet (relative intensity 2) at 58.6 p.p.m., a group of bands (relative intensity 6) comprised between 54.5 and 56.0 p.p.m., a triplet (relative intensity 3) at 57.6 p.p.m. The signals showed a fine structure.

$CF_3$—O—$CF_2$—COF: The NMR spectrum showed a singlet (relative intensity 1) at −13.4 p.p.m. (from $CFCl_3$); a quartet (relative intensity 2) at 80.0 p.p.m.; a triplet (relative intensity 3) at 56.6 p.p.m. All the signals showed a fine structure.

$CF_3$—O—$CF_2$—O—$CF_2$—COF: The NMR spectrum showed a triplet (relative intensity 1) at −13.3 p.p.m (from $CFCl_3$); a triplet of doublets (relative intensity 2) at 79.0 p.p.m.; a sextet (relative intensity 2) at 54.0 p.p.m., a triplet (relative intensity 3) at 57.5 p.p.m.

For the previously mentioned higher homologues, corresponding to the general formula (B) the NMR spectrum was carried out on the free carboxylic acids, which were easily obtainable from the acid fluorides by hydrolysis. Obviously, the recognition of the structure of the acids also showed the structure of the relevant acid fluorides.

$CF_3$—O—$(CF_2O)_2$—$CF_2$—COOH: The NMR spectrum showed a triplet (relative intensity 2) at 80.0 p.p.m. (from $CFCl_3$); a quintet (relative intensity 2) at 53.4 p.p.m.; a sextet (relative intensity 2) at 55.7 p.p.m., a triplet (relative intensity 3) at 57.7 p.p.m. All the signals showed a fine structure.

In the NMR spectrum of the proton a signal due to the hydrogen of the carboxyl was noted.

$CF_3$—O—$(CF_2O)_3$—$CF_2$—COOH: The NMR spectrum showed a triplet (relative intensity 2) at 80.0 p.p.m. (from $CFCl_3$); a quintet (relative intensity 2) at 53.2 p.p.m., a group of bands (relative intensity 4) between 54.5 and 56.0 p.p.m., a triplet (relative intensity 3) at 57.5 p.p.m. The signals showed a fine structure.

In the NMR spectrum of the proton a signal due to the hydrogen of the carboxyl was present.

$CF_3$—O—$(CF_2O)_4$—$CF_2$—COOH: The NMR spectrum showed a triplet (relative intensity 2) at 80.3 p.p.m.; a quintet (relative intensity 2) at 53.5 p.p.m.; a group of bands (relative intensity 6) between 54.8 and 56.6 p.p.m., a triplet (relative intensity 3) at 57.8 p.p.m. The signals showed a fine structure.

In the NMR spectrum of the proton a signal due to the hydrogen of the carboxyl was present.

As regards the mixture of products with a higher molecular weight, the NMR showed a structure analogous to that of the aforedescribed products and corresponding to the general formulae defined as (A) and (B). The intensity of the signals corresponding to the terminal groups showed for the products of the mixture an average number molecular weight of about $10^3$.

EXAMPLE 2

The experiment of Example 1 was repeated, the only difference being that the temperature of the reactor was 305° C. A conversion of 5.2% was obtained for the $C_3F_6$ subjected to the reaction.

The reaction products and their distribution were substantially those described in Example 1.

EXAMPLE 3

In a tubular Pyrex glass reactor having an inner diameter of 3 mm. and heated at 360° C. for a length of 270 mm. by means of an electric furnace, there were simultaneously passed under atmospheric pressure $C_3F_6$ with a flow rate of 0.600 N l./h. and $O_2$ with a flow rate of 1,200 N l./h.

The reaction products leaving the reactor were collected and analyzed. The conversion of $C_3F_6$ was about 77.2%. The distribution of the reaction products was as follows, expressed as percent by weight on the total of the reaction products:

| | Percent |
|---|---|
| Carbonyl fluoride, $COF_2$ | 38.2 |
| Trifluoroacetylfluoride, $CF_3$—COF | 40.0 |
| Trifluoromethylfluoroformate, $CF_3$—O—COF | 6.2 |
| 3-oxa-pentafluorobutanoylfluoride, $CF_3OCF_2COF$ | 2.4 |
| 2-oxa-pentafluoropropylfluoroformate, $CF_3$—O—$CF_2$—O—COF | 4.1 |
| 3,5-dioxa-heptafluorohexanoylfluoride, $CF_3OCF_2OCF_2COF$ | 1.0 |
| 2,4-dioxa-heptafluoropentylfluoroformate, $CF_3O(CF_2O)_2COF$ | 3.7 | and also 4.4% by weight of higher homologues, as in Example 1.

EXAMPLE 4

Into a tubular stainless steel reactor having an inner diameter of 4 mm. and heated at 700° C. for a length of 270 mm. by means of an electric furnace, there were simultaneously introduced under atmospheric pressure $C_3F_6$ with a flow rate of 0.8 N l./h. and $O_2$ with a flow rate of 1.0 N l./h.

The reaction products leaving the reactor were collected an analyzed. The conversion of $C_3F_6$ was about 93.5% and the distribution of the reaction products was as follows, there being reported the percentages by weight on the total reaction products:

| | Percent |
|---|---|
| Carbonyl fluoride, $COF_2$ | 41.0 |
| Trifluoroacetylfluoride, $CF_3$—COF | 46.1 |
| Trifluoromethylfluoroformate, $CF_3$—O—COF | 0.2 |
| 3-oxa-pentafluorobutanoylfluoride, $CF_3OCF_2COF$ | 3.8 |
| 2-oxa-pentafluoropropylfluoroformate, $CF_3$—O—$CF_2$—O—COF | 1.5 |
| 3,5-dioxa-heptafluorohexanoylfluoride, $CF_3OCF_2OCF_2COF$ | 2.2 |
| 2,4-dioxa-heptafluoropentylfluoroformate, $CF_3O(CF_2O)_2COF$ | 0.5 | and also 4.9% of higher homologues, as in Example 1.

EXAMPLE 5

Into a tubular stainless steel reactor of an inner diameter of 4 mm. heated at 600° C. for a length of 270 mm. by means of an electric furnace, there were simultaneously introduced under atmospheric pressure $C_3F_6$ with a flow rate of 1.0 N l./h. and $O_2$ with a flow rate of 1.5 N l./h. The gases leaving the reactor were collected and analyzed. The conversion of $C_3F_6$ was 98.8% and the distribution of molecular weights of the products obtained was as follows:

| | Percent by weight |
|---|---|
| Carbonyl fluoride, $COF_2$ | 45.0 |
| Trifluoroacetyl fluoride, $CF_3$—COF | 46.1 |
| Trifluoromethylfluoroformate, $CF_3$—O—COF | 0.1 |
| 3-oxa-pentafluorobutanoylfluoride, $CF_3OCF_2COF$ | 3.5 |
| 2-oxa-pentafluoropropylfluoroformate, $CF_3$—O—$CF_2$—O—COF | 2.9 | and also 2.4% by weight of liquid products consisting essentially of 2,4 - dioxa-heptafluoropentylfluoroformate, $CF_3O(CF_2O)_2COF$, and of 3,5-dioxa-heptafluoro-hexanoylfluoride, $CF_3OCF_2OCF_2COF$.

Variations can, of course, be made without departing from the spirit and scope of this invention.

What we claim is:

1. A polyoxyperfluoromethylene compound of the formula $CF_3$—O—$(CF_2O)_m$—COF or $$CF_3\text{—O—}(CF_2O)_n\text{—}CF_2\text{—COF}$$

wherein $m$ is a whole number from 1 to 13 and $n$ is a whole number from 1 to 13.

2. The polyoxyperfluoromethylene compound of claim 1 having the formula $CF_3$—O—$CF_2$—O—COF.

3. The polyoxyperfluoromethylene compound of claim 1 having the formula $CF_3$—O—$(CF_2O)_2$—COF.

4. The polyoxyperfluoromethylene compound of claim 1 having the formula $CF_3$—O—$(CF_2O)_3$—COF.

5. The polyoxyperfluoromethylene compound of claim 1 having the formula $CF_3O$—$(CF_2O)_4$—COF.

6. The polyoxyperfluoromethylene compound of claim 1 having the formula $CF_3$—O—$CF_2O$—$CF_2$—COF.

7. The polyoxyperfluoromethylene compound of claim 1 having the formula $CF_3$—O—$(CF_2O)_2$—$CF_2$—COF.

8. The polyoxyperfluoromethylene compound of claim 1 having the formula $CF_3$—O—$(CF_2O)_3CF_2$—COF.

9. The polyoxyperfluoromethylene compound of claim 1 having the formula $CF_3$—O—$(CF_2O)_4$—$CF_2$—COF.

10. A process for the preparation of polyoxyperfluoromethylene compounds having a formula selected from the group consisting of $CF_3$—O—$(CF_2O)_n$—COF and $$CF_3\text{—O—}(CF_2O)_n\text{—}CF_2\text{—COF}$$

wherein $n$ is 0 or a whole number from 1 to 13, this process comprising reacting in the gaseous phase a reaction mixture consisting of hexafluoropropylene and molecular oxygen in molar ratios of from about 2:1 to 1:10, under a pressure of from about 0.1 to 10 atmospheres at a temperature of from about 300° to about 1000° C. for a heating time of from about 0.01 to 20 seconds.

11. The process of claim 10 wherein the molar ratio of hexafluoropropylene to molecular oxygen is from about 1:1 to about 1:3.

12. The process of claim 10 wherein the pressure is from about 0.2 to 2 atmospheres.

13. The process of claim 10 wherein the temperature is from about 35° C. to 700° C.

14. The process of claim 10 wherein the heating time is from about 0.1 to 10 seconds.

References Cited

Wethington: Proceeding U.N. Conference Peaceful Uses of Atomic Energy—2nd Geneva Conf. (1958), pp. 132–4.

LORRAINE A. WEINBERGER, Primary Examiner

R. D. KELLY, Assistant Examiner

U.S. Cl. X.R.

8—94.14, 115.6; 252—51.5 R, 54.6, 79; 260—32.2, 484 R, 535 H, 544 F, 561 HL, 561 B, 465.6, 615 BF

UNITED STATES PATENT OFFICE
CERTIFICATE OF CORRECTION

Patent No. 3,721,696    Dated March 20, 1973

Inventor(s) Dario Sianesi et al.

It is certified that error appears in the above-identified patent and that said Letters Patent are hereby corrected as shown below:

Column 1, after line 9 and before line 10 insert the following paragraph:

-- Claims priority, application Italy, July 12, 1966, prov. 20.116 --;

Column 4, line 39, "quartet relative" should read -- quartet (relative --.

Signed and sealed this 19th day of March 1974.

(SEAL)
Attest:

EDWARD M. FLETCHER, JR.  C. MARSHALL DANN
Attesting Officer        Commissioner of Patents